US008532597B2

(12) United States Patent
Chu

(10) Patent No.: US 8,532,597 B2
(45) Date of Patent: Sep. 10, 2013

(54) METHOD AND MOBILE TERMINAL FOR SEARCHING ALTERNATIVE FREQUENCY USING RADIO DATA SYSTEM

(75) Inventor: Hean Gwang Chu, Masan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1098 days.

(21) Appl. No.: 12/471,927

(22) Filed: May 26, 2009

(65) Prior Publication Data

US 2010/0029233 A1 Feb. 4, 2010

(30) Foreign Application Priority Data

Jul. 30, 2008 (KR) ........................ 10-2008-0074708

(51) Int. Cl.
*H04B 1/18* (2006.01)

(52) U.S. Cl.
USPC .................................... 455/179.1; 455/161.3

(58) Field of Classification Search
USPC ............. 455/130, 150.1, 179.1, 185.1, 136.1; 370/475, 510–514
See application file for complete search history.

(56) References Cited

U.S. PATENT DOCUMENTS

| | | | |
|---|---|---|---|
| 5,428,825 | A | 6/1995 | Tomohiro et al. |
| 7,848,700 | B2 | 12/2010 | Kim |
| 2007/0129035 | A1 | 6/2007 | Olson et al. |

FOREIGN PATENT DOCUMENTS

| | | | |
|---|---|---|---|
| EP | 0 508 369 | A1 | 10/1992 |
| EP | 508369 | A1 * | 10/1992 |
| EP | 0 552 442 | A2 | 7/1993 |
| EP | 1 536 580 | A2 | 6/2005 |
| KR | 10-2000-0038180 | A | 7/2000 |
| KR | 10-0736497 | B1 | 6/2007 |
| WO | 98/44663 | A1 | 10/1998 |

* cited by examiner

*Primary Examiner* — Yuwen Pan
*Assistant Examiner* — Fatuma Sherif
(74) *Attorney, Agent, or Firm* — Jefferson IP Law, LLP

(57) ABSTRACT

A method and mobile terminal for searching for alternative frequencies is provided for facilitating alternative frequency search. The mobile terminal having an alternative frequency search function includes a control unit having a radio data decoder for decoding radio data containing a program identifier and for differentiating the radio data by type, a radio data filter for extracting the program identifier from the radio data and for comparing the extracted program identifier with a previously stored program identifier, and a radio data updater for updating an alternative frequency list in response to an instruction of the radio data filter, and a storage unit for storing the alternative frequency list and the differentiated radio data. The alternative frequency search method and mobile terminal of the present invention facilitates alternative frequency search by updating the alternative frequency list only when the program identifier decoded from Radio Data System (RDS) data is substantially identical with the previously stored program identifier.

15 Claims, 6 Drawing Sheets

S330

METHOD AND MOBILE TERMINAL FOR SEARCHING ALTERNATIVE FREQUENCY USING RADIO DATA SYSTEM

PRIORITY

This application claims the benefit under 35 U.S.C. §119(a) of a Korean patent application filed in the Korean Intellectual Property Office on Jul. 30, 2008 and assigned Serial No. 10-2008-0074708, the entire disclosure of which is hereby incorporated by reference.

BACKGROUND OF THE INVENTION

1. Field of the Invention

The present invention relates to a radio function of a mobile terminal. More particularly, the present invention relates to a method and mobile terminal for searching for alternative frequencies that is capable of improving facilitating alternative frequency search by updating an alternative frequency list only when a program identifier decoded from Radio Data System (RDS) data is substantially identical with a previously stored program identifier.

2. Description of the Related Art

Recently, mobile terminals are integrating more and more supplementary functions such as a camera function, a broadcast receiver function, and an MP3 player function. A radio receiver function is becoming one of attractive add-on functions of a mobile terminal. In order to support the radio receiver function, the mobile terminal may be equipped with a radio receiver module.

Meanwhile, a Radio Data System (RDS) has been developed for transmitting digital information such as broadcast stations and programs using the conventional radio broadcasts. The RDS uses a Frequency Modulation (FM) subcarrier for providing information service such as traffic information, stock information, paging information, broadcast station information, auto-tuning services, and the like. Typically, an RDS-enabled radio receiver is provided with an alternative frequency search function allowing the radio receiver to retune to a frequency having the highest sensitivity among alternative frequencies providing the same station, using an alternative frequency list, when the first signal becomes too weak.

However, most of the conventional alternative frequency search techniques are not well-featured to meet the user's expectations. Accordingly, there is a need to develop an improved alternative frequency search technique.

SUMMARY OF THE INVENTION

An aspect of the present invention is to address at least the above-mentioned problems and/or disadvantages and to provide at least the advantages described below. Accordingly, an aspect of the present invention is to provide a method and mobile terminal for searching for alternative frequencies that is capable of improving accuracy of alternative frequency search by updating an alternative frequency list only when a program identifier decoded from RDS data is substantially identical with a previously stored program identifier.

Also, another aspect of the present invention is to provide a method and mobile terminal for searching for alternative frequencies that is capable of a fast alternative frequency search by updating an alternative frequency list only with most available alternative frequencies around the current location of the mobile terminal.

In accordance with an aspect of the present invention, a mobile terminal having an alternative frequency search function includes a control unit is provided. The terminal includes a radio data decoder for decoding radio data containing a program identifier and for differentiating radio data by type, a radio data filter for extracting the program identifier from radio data and for comparing the extracted program identifier with a previously stored program identifier, and a radio data updater for updating an alternative frequency list in response to an instruction of the radio data filter, and a storage unit for storing the alternative frequency list and the differentiated radio data. In an exemplary implementation, the control unit further includes a radio data comparator for counting a number of receipts of individual alternative frequencies listed in the alternative frequency list after updating the alternative frequency list and for removing the alternative frequencies of which count value is less than a threshold count value from the alternative frequency list.

In accordance with another aspect of the present invention, an alternative frequency search method for a mobile terminal is provided. The method includes decoding radio data including a program identifier and differentiating decoded radio data by type, comparing the program identifier decoded from the radio data with a previously stored program identifier, and updating, when the decoded program identifier is substantially identical with the previously stored program identifier, an alternative frequency list. In an exemplary implementation, the alternative frequency search method further includes counting receipts of individual alternative frequencies listed in the alternative frequency list, and removing the alternative frequency of which count value of receipts is less than a threshold count value from the alternative frequency list.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

In the following description, an alternative frequency search method of the present invention is described with a Radio Data System (RDS). The RDS is a system that transmits data such as traffic information in an FM broadcast frequency band. The FM frequency band includes a left channel (L) and a right channel (R) encoded into a main channel (L+R: 0~15 kHz) and a sub-channel (L-R: 23~53 kHz), a stereo pilot signal (19 kHz), and optional subsidiary channels of 57 kHz, 67 kHz, and 92 kHz. The RDS uses 57 kHz subcarrier to carrier data at 1187 bits per second. The RDS can be used for automatically seeking and tuning to a text information service such as traffic service and paging. The subscribers 67 kHz and 92 kHz can be used for Digital Audio Broadcast (DAB).

In the following description, the mobile terminal can be any one of a mobile phone, a digital broadcast receiver, a Personal Digital Assistant (PDA), a Smartphone, a 3$^{rd}$ Generation (3G) communication terminal including a Global System for a Mobile Communication (GSM)/General Packet Radio System (GPRS) terminal, a Wideband Code Division Multiple Access (WCDMA) terminal including an International Mobile Telecommunication 2000 (IMT-2000) terminal and a Universal Mobile Telecommunication Service (UMTS) terminal, and their equivalent devices equipped with a radio receiver module. That is, the alternative frequency search method can be applied to any type of terminals equipped with a radio receiver module that can receive both the audio and data signals.

Figure 1:
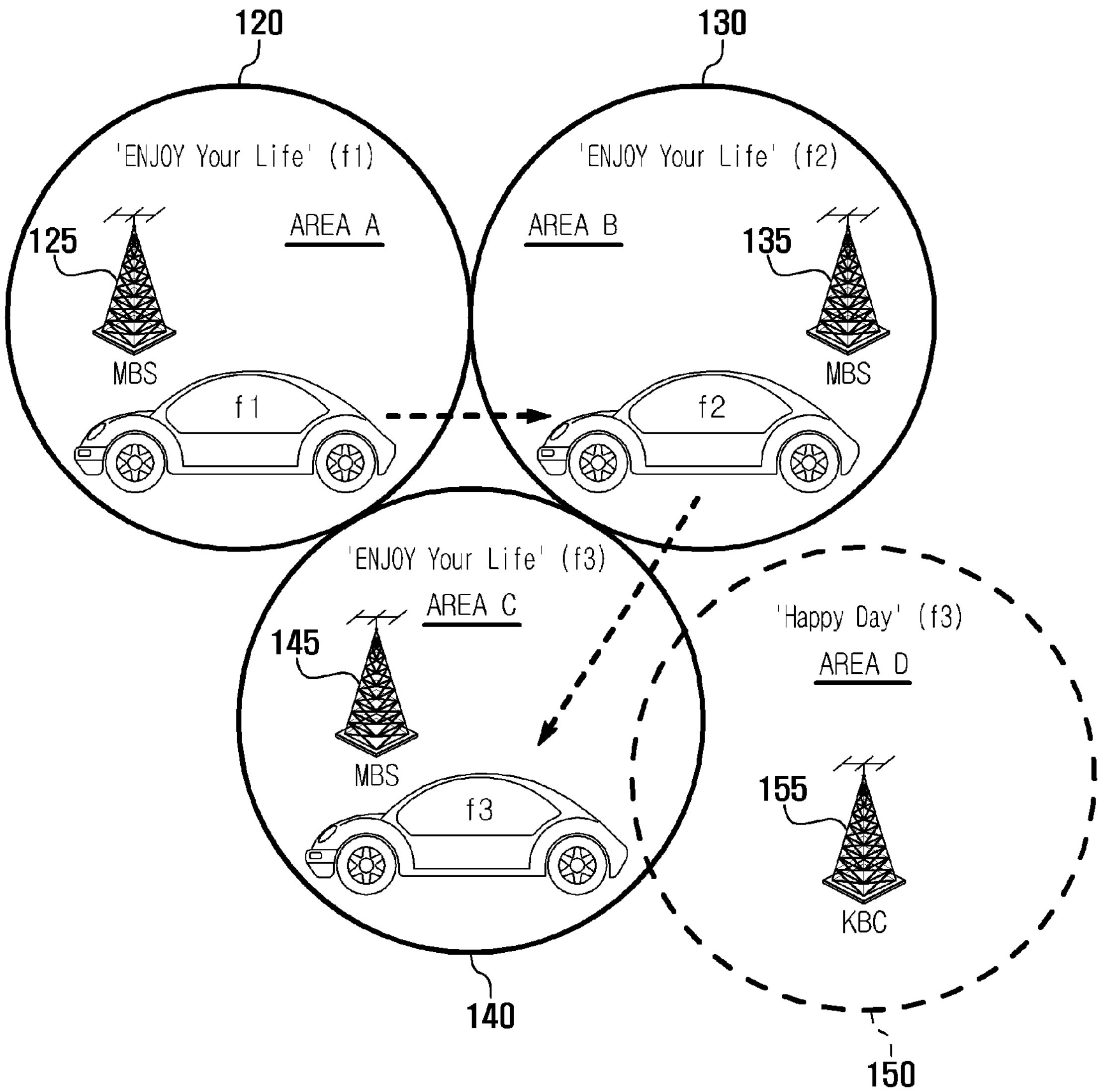
FIG. 1 is a diagram illustrating a radio broadcast system adopting an alternative frequency search method according to an exemplary embodiment of the present invention.

FIG. 1 is a diagram illustrating a radio broadcast system adopting an alternative frequency search method according to an exemplary embodiment of the present invention.

Referring to FIG. 1, the radio broadcast system includes service coverage areas A, B, C, and D 120, 130, 140, and 150 defined by the radio coverage of respective broadcast stations 125, 135, 145, and 155.

The alternative frequency search method is described with an exemplary situation in that a mobile terminal 110 moves from the service coverage area A 120 moves to the service coverage area C 140 via the service coverage area C while seamlessly receiving the same program entitled ‘ENJOY YOUR LIFE’.

In the service coverage area 120, an MBS station 125 broadcasts the program ‘ENJOY YOUR LIFE’ at frequency f1. The mobile terminal 110 is receiving the program ‘ENJOY YOUR LIFE’ using its radio module at frequency f1 in the service coverage area 120 of the MBS station 125. Here, the mobile terminal 110 receives and stores radio data transmitted by the MBS station 125. The radio data contains an alternative frequency list having information of frequencies at which other stations broadcast the ‘ENJOY YOUR LIFE’. The alternative frequency list may be formatted as shown in Table 1.

TABLE 1

| | Area A | Area B | Area C | Area D |
|---|---|---|---|---|
| Frequency | f1 | f2 | f3 | f4 |

That is, from the alternative frequency list transmitted by the MBS station 125, the mobile terminal 110 acquires information that the program ‘ENJOY YOUR LIFE’ is broadcasted at frequency f1 for the area A, frequency f2 for the area B, and frequency f3 for the area C.

If the signal strength becomes weak at frequency f1 as the mobile terminal 110 moves from the area A 120 to the area B 130, the mobile terminal 110 scans the frequencies indicated by the alternative frequency list for seamless reception of the ongoing program. Since the same program is broadcast at frequency f2 in area B 130, the signal strength of the program is likely to be the best at frequency f2 as approaching to the area B 130. Accordingly, the mobile terminal 110 retunes to the frequency f2. In the area B 130, the mobile terminal 110 also receives the radio data transmitted by another MBS station 135. This radio data also carries an alternative frequency list containing information on the frequencies at which the ‘ENJOY YOUR LIFE’ is broadcast.

Also, if the signal strength becomes weak at the frequency at frequency f2 as the mobile terminal 110 moves from the area B 130 to the area C 140, the mobile terminal 110 scans the frequencies indicated by the alternative frequency list received from the MBS station 135 for seamless reception of the ongoing program, i.e. the ‘ENJOY YOUR LIFE’. In this case, since the program ‘ENJOY YOUR LIFE’ is broadcast at frequency f3 in the area C 140, the mobile terminal 110 retunes to frequency f3. In the area C 140, the mobile terminal 110 receives the radio data transmitted by another MBS station 145.

In the boundary area at which the area C and the area D overlap with each other, however, a different program broadcast by the KBC station 155 may be received at frequency f3. In other words, the mobile terminal 110 may receive a program ‘HAPPY DAY’ broadcast by the KBC station 155 as well as the program ‘ENJOY YOUR LIFE’ broadcast by the MBS station 145 at frequency f3 even in the area C 140. Accordingly, the mobile terminal 110 may receive the radio data (hereinafter called first radio data) transmitted by the MBS station 145 covering the area C 140 and the radio data (hereinafter called second radio data) transmitted by the KBC station 155 covering the area D 150 at frequency f3. In case that the mobile terminal 110 receives the second radio data transmitted by the KBC station 155 rather than the first radio data transmitted by the MBS station 145, it fails to scan the correct alternative frequencies for the program ‘ENJOY YOUR LIFE’.

In order to avoid this problem, when the mobile terminal 110 has received a radio data in the area C 140, it extracts a Program Identifier (PID) contained in the received radio data and updates the alternative frequency list only when the Program Identifier is substantially identical with the previously stored Program Identifier. The previously stored Program Identifier is the one identifying the program received at the radio module powers on.

Referring to the exemplary situation illustrated in FIG. 1, when the mobile terminal 110 receives the radio data transmitted by the KBC station 155 covering the area D 150 in the area C 140, it compares the previously stored Program Identifier indicating the program 'ENJOY YOUR LIFE' with the Program Identifier indicating the program 'HAPPY DAY' broadcast by the KBC station 155. In this case, since the two Program Identifiers differ from each other, the mobile terminal 110 does not update its alternative frequency list.

In this manner, the alternative frequency search method updates the alternative frequency list only when the currently received program identifier is substantially identical with the previously stored program identifier, thereby improving accuracy of alternative frequency search.

Figure 2:
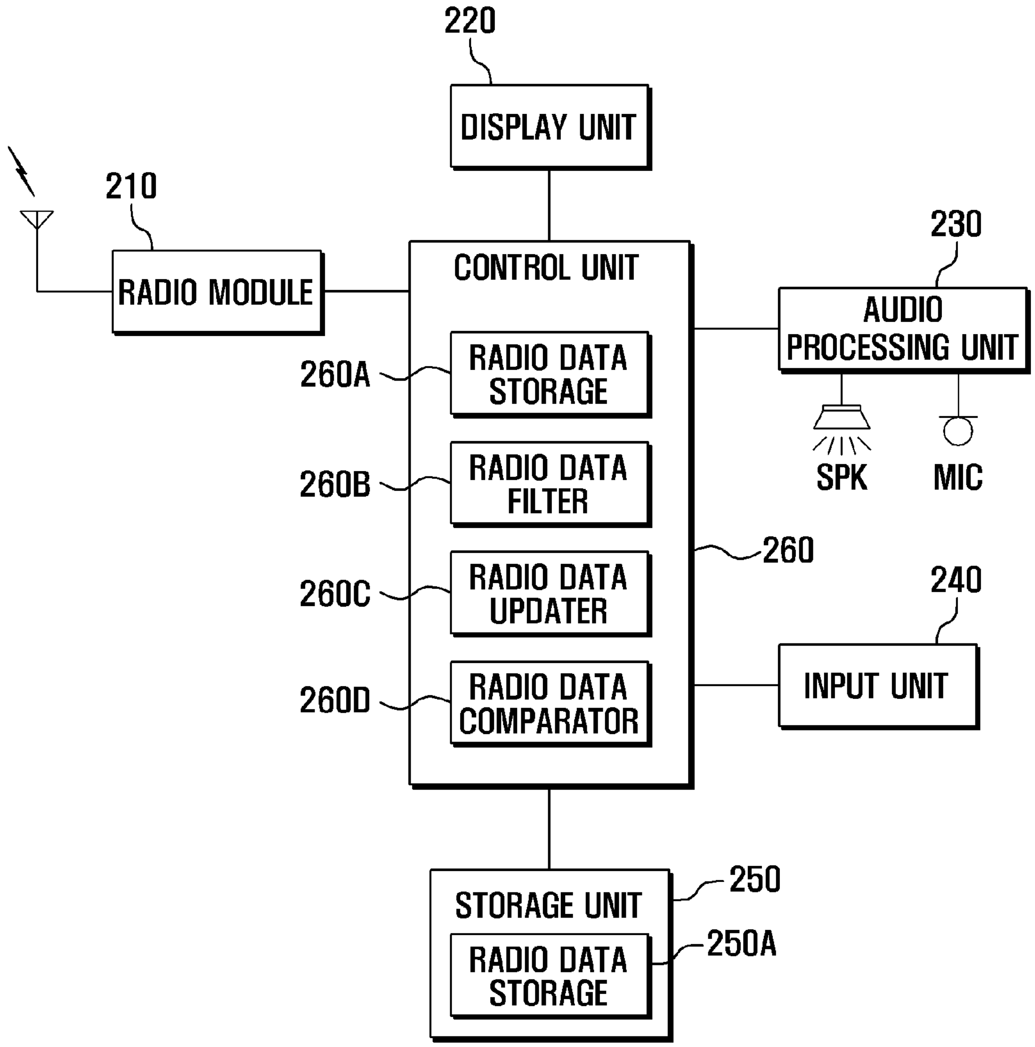
FIG. 2 is a diagram illustrating a configuration of a mobile terminal according to an exemplary embodiment of the present invention.

FIG. 2 is a diagram illustrating a configuration of a mobile terminal according to an exemplary embodiment of the present invention.

Referring to FIG. 2, the mobile terminal includes a radio module 210, a display unit 220, an audio processing unit 230, an input unit 240, a storage unit 250, and a control unit 260. The storage unit 250 includes a radio data storage 250A, and the control unit 260 includes a radio data decoder 260A, a radio data filter 260B, a radio data updater 260C, and a radio data comparator 260D.

The radio module 210 is a radio receiver module for receiving radio signals broadcast by a radio station. The radio module 210 can be configured to receive the radio signals transmitted in a broadcast format of the radio stations. For example, the radio module 210 can be configured to receive the radio signals in the FM broadcast format and/or the Amplitude Modulation (AM) broadcast format depending on the radio stations. The radio module 210 is configured to receive the radio data transmitted by the radio stations and output the radio data to the control unit 260.

The display unit 220 provides a visual interface for displaying various screen images such as a radio module operation status screen, an idle mode screen, a menu screen, a call progression screen, and the like. The display unit 220 can be implemented with a Liquid Crystal Display (LCD). In this case, the display unit 220 can be provided with an LCD controller, a video memory for storing video data, and LCD devices. Particularly in an exemplary embodiment, when the display unit 220 supports touchscreen function, it can works as a part of the input unit 240.

The audio processing unit 230 plays an audio signal output by a data processor of the control unit 260 and outputs the audio signal including voice input through a microphone MIC to the data processor. That is, the audio processing unit 230 processes the audio data so as to be output through a speaker SPK in a form of audible sound wave and processes the audio signal input through the microphone MIC to be output to the data processor. Particularly in an exemplary embodiment, the audio processing unit 230 processes the audio data including voice received through the radio module 210 to be output through the speaker SPK.

The input unit 240 receives information related to user configuration and control and outputs a corresponding key sequence to the control unit 260. The input unit 240 is provided with a plurality of alphanumeric keys for receiving alphanumeric data and function keys for configuring and executing various functions of the mobile terminal. In an exemplary embodiment, the input unit 240 is configured to generate key sequences for activating the radio module 210 and executing functions related to the radio module 210.

The storage unit 250 stores application programs and data related to operations of the mobile terminal 110. The storage unit 250 may include a program memory region and a data memory region. The program memory region stores an Operating System (OS) for booting up the mobile terminal and application programs for implementing the idle mode screen and for executing supplementary functions of the mobile terminal such as a camera function, an audio playback function, and a video (including still and motion images) playback function. The mobile terminal 110 provides its functions by executing these applications related to the respective functions in response to the user commands.

The data memory region stores the application data generated while running the application programs and the data copied from an external memory device and hard disk and downloaded from a web server through wired and wireless network. The data memory region also can store user data related to various supplementary functions such as still and motion images taken by using the camera function and audio files recorded using a voice recording function.

Particularly in an exemplary embodiment, the storage unit 250 includes the radio data storage 250A for storing the radio data received from a radio station. The radio data may be classified as shown in Table 2.

TABLE 2

| Data | Function |
|---|---|
| Program Identifier (PI) | Identify country, area, and program |
| Alternative Frequency (AF) | Different frequency of neighbor station providing same program |
| Traffic Program (TP) | Stations broadcasting traffic information |
| Program Type (PTY) | Type of program |
| Traffic Announcement (TA) | Provide current traffic information |
| Other Network (ON) | Monitor information of other network |
| Program Item Number (PIN) | Reserved reception (scheduled broadcast time) |
| Decoder Identification (DI) | Distinguish between mono and stereo |
| Music/Speech/Switch (M/S) | Volume control for music and voice |
| Program Service (PS) | Display 8-character program title |
| Radio Text (RT) | Textual information |
| Transparent Data Channel (TDC) | Data service |
| Paging | Radio paging service |
| In-house Application (IH) | Use in station |
| Clock-time and data (CT) | Time information |

The control unit 260 controls signaling among internal blocks of the mobile terminal 110. The control unit 260 activates a radio reception application program in response to a signal input from the input unit 240 and controls the radio module 210 to tune to a frequency at which the program selected by the user is broadcast. The control unit 260 controls the radio module 210 to receive the radio program and radio data received over the frequency channel. The control unit 260 also controls such that the radio program is output through the audio processing unit 230. The control unit 260 measures the received signal strength at the frequency using the radio module 210 and determines whether the measured signal strength is greater than a present threshold value. If the measured signal strength is less than the threshold value, the control unit 260 controls the mobile terminal 110 to search for an alternative frequency.

In an exemplary embodiment of the present invention, the control unit 260 includes a radio data decoder 260A, a radio data filter 260B, a radio data updater 260C, and a radio data comparator 260D.

The radio data decoder 260A decodes the radio data received through the radio module 210 and differentiates types of the radio data. In order to improve the accuracy of the differentiation of the radio dates types, the radio data decoder 260A can determine the number of times received the radio data. In an exemplary implementation, the Program Identifier is determined more than 3 times for improving the identification accuracy. The radio data decoder 260A may instruct the radio data updater 260C to update the radio data except for the alternative frequency list. The alternative frequency list is updated after the program identifier comparison process which is described later.

The radio data filter 260B filters the program identifier among the radio data differentiated by the radio data decoder 260A and compares the filtered program identifier with the previously stored program identifier. When the filtered program identifier is substantially identical with the previously stored program identifier, the radio data filter 260B instructs the radio data updater 260C to update the alternative frequency list.

The radio data updater 260C receives the update instruction from the radio data decoder 260A or the radio data filter 260B and updates the radio data in response to the update instruction. The alternative frequency list is updated only when the currently received program identifier is substantially identical with the previously stored program identifier.

The radio data comparator 260D counts the number of receipts of the individual frequencies listed in the alternative frequency list whenever the alternative frequency list is updated. When a number of receipts of an alternative frequency is less than an average of total alternative frequencies, the radio data comparator 260D deletes the alternative frequency from the alternative frequency list.

This indicates that that the alternative frequency list is configured to list only the alternative frequencies available around the current location of the mobile terminal 110 rather than all alternative frequencies. Accordingly, any alternative frequency which is allocated to a remote station far from the current location of the mobile terminal 110 is not contained in the alternative frequency list. Since the number of alternative frequencies registered with alternative frequency list is reduced due to the deletion of the alternative frequencies unavailable at the current location, it is shortened to scan the alternative frequencies, resulting in reduction of alternative frequency search time.

Figure 3:
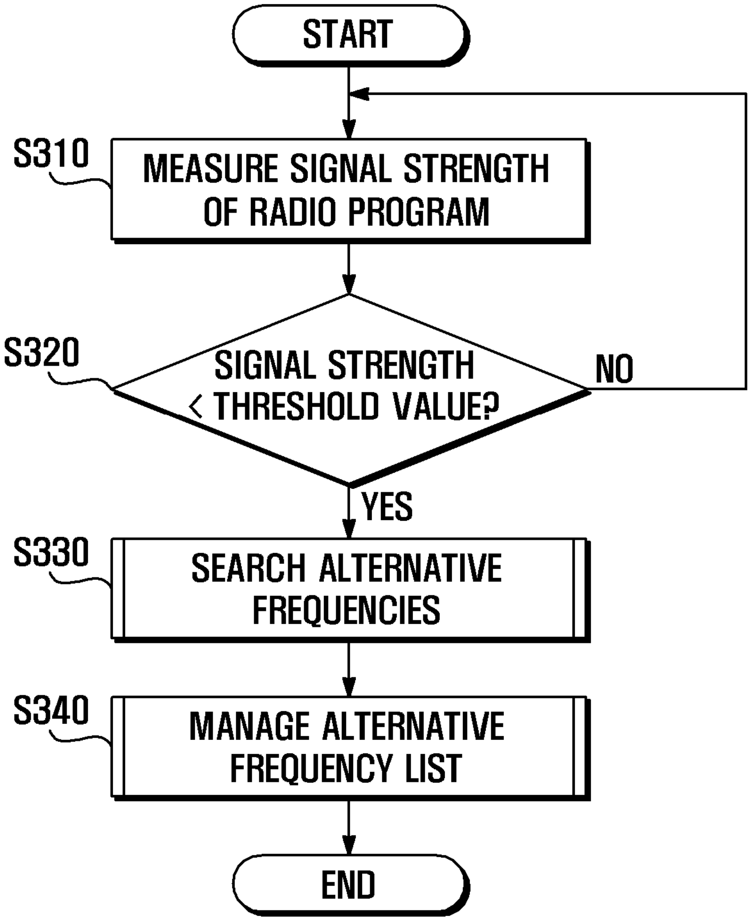
FIG. 3 is a flowchart illustrating an alternative frequency search method according to an exemplary embodiment of the present invention.

FIG. 3 is a flowchart illustrating an alternative frequency search method according to an exemplary embodiment of the present invention.

Referring to FIG. 3, the control unit 260 of the mobile terminal 110 first measures the signal strength of a radio program received using the radio module 210 at step S310 and determines whether the received signal strength is equal to or less than a threshold value at step S320. If the received signal strength is greater than the threshold value, then the control unit 260 controls such that the mobile terminal 110 keeps receiving the radio program at the current frequency. In contrast, if the received signal strength is equal to or less than the threshold value, the control unit 260 controls such that the mobile terminal 110 searches for alternative frequencies at step S330. Next, the control unit 260 manages the alternative frequency list by removing the alternative frequencies, of which number of receipts is less than the average number of receipts of the total alternative frequencies, from the alternative frequency list at step S340.

Figure 4:
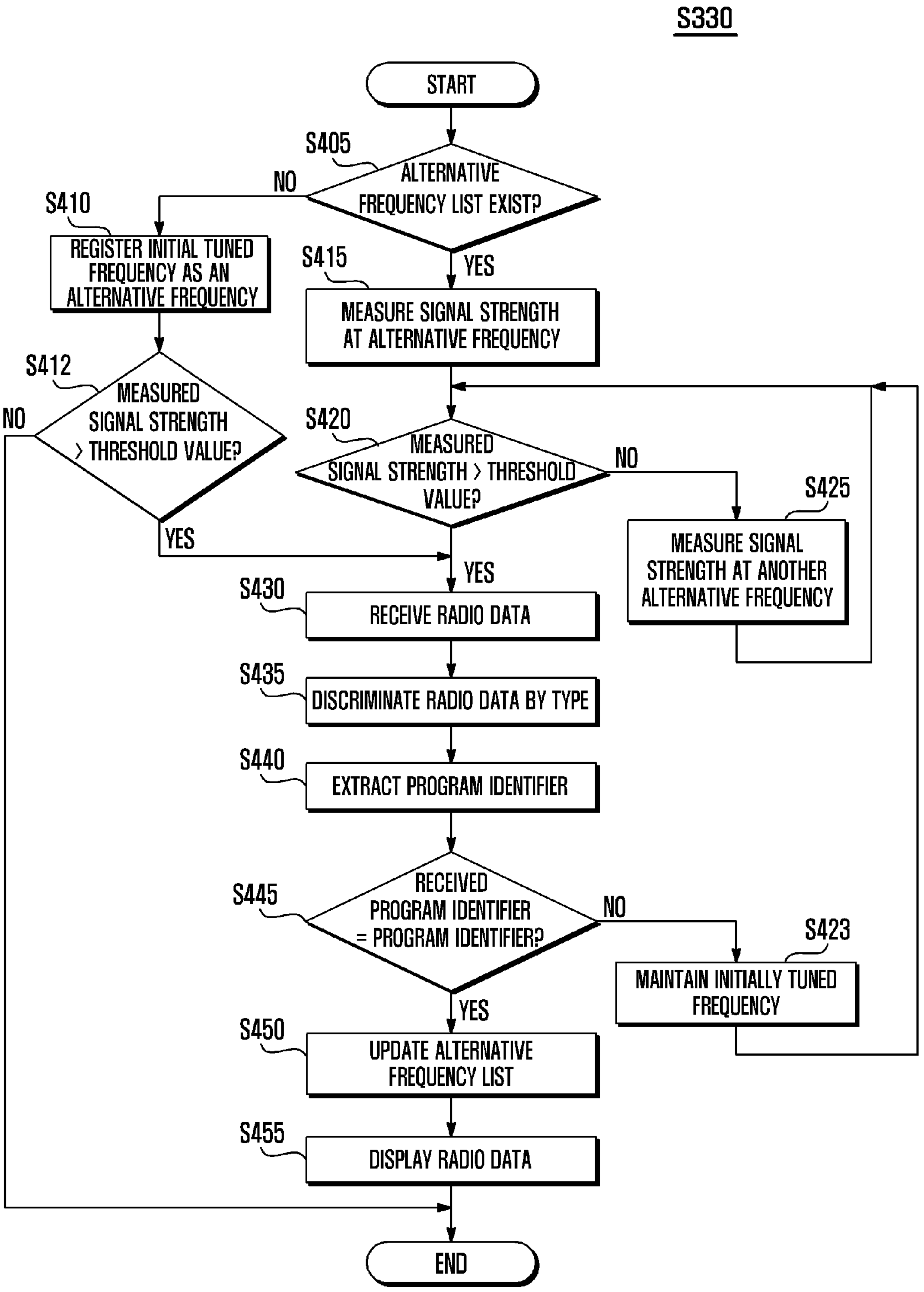
FIG. 4 is a flowchart illustrating an alternative frequency search operation according to an exemplary embodiment of the present invention.

FIG. 4 is a flowchart illustrating an alternative frequency search operation according to an exemplary embodiment of the present invention.

Referring to FIG. 4, when the received signal strength of the radio program is equal to or less than the threshold value, the control unit 260 determines whether an alternative frequency list exists at step S405. Typically, since the signal strength of the radio data is weaker than that of the radio program in the same area, the mobile terminal 110 may fail to receive radio data despite receiving the radio program correctly. In case than no alternative frequency list is not prepared yet, the control unit 260 registers the initial frequency tuned thereto as an alternative frequency at step S410 and determines whether the signal strength of the radio program at the alternative frequency is greater than a threshold value at step S412. If the signal strength is greater than the threshold value at step S412, the process proceeds to step S430.

In contrast, if an alternative frequency list exists at step S405, then the control unit 260 measures the signal strength of one the alternative frequencies listed in the alternative frequency list at step S415 and determines whether the signal strength of the alternative frequency is greater than the threshold value at step S420. If the signal strength is not greater than the threshold value, the control unit 260 determines whether the signal strength of another alternative frequency is greater than the threshold value at step S425. Otherwise, if the signal strength of the alternative frequency is greater than the threshold value at step S412 or S420, the control unit 260 controls the radio module 210 to receive the radio data at step S430.

Here, the control unit 260 controls to repeat checking the receipt of the radio data multiple times for acquiring accurate radio data. More particularly, since the program identifier is important to identify the radio station using the alternative frequency, the repeated analysis of the radio data is required for improving identification accuracy of the alternative frequency. In an exemplary implementation, the radio data checking process is repeated at least 3 times.

Once the radio data are correctly received, the control unit 260 controls the radio data decoder 260A to decode the radio data and differentiate the radio data by type as shown in Table 2 at step S435. Here, the radio data decoder 260A instructs the radio data updater 260C to update the radio data except for the alternative frequency list.

Next, the control unit 260 controls the radio data filter 260B to filter the Program Identifier (PI) at step S440 and determines whether the filtered program identifier is substantially identical with the previously stored program identifier at step S445. If the filtered program identifier is not substantially identical with the previously stored program identifier, this indicates that the radio program broadcast at the frequency is not substantially identical with the radio program received at the previous frequency such that the alternative frequency list is not need to be updated. In this case, the control unit 260 controls such that the mobile terminal 110 maintains receiving the radio program at the initialed tuned frequency and repeats alternative frequency search at step S423.

In contrast, if the filtered program identifier is substantially identical with the previously stored program identifier at step S445, the control unit 260 controls the radio data updater 260C to update the alternative frequency list at step S450 and controls the display unit 220 to display preset information such as traffic information, text information, and time information extracted from the radio data at step S455.

Figure 5:
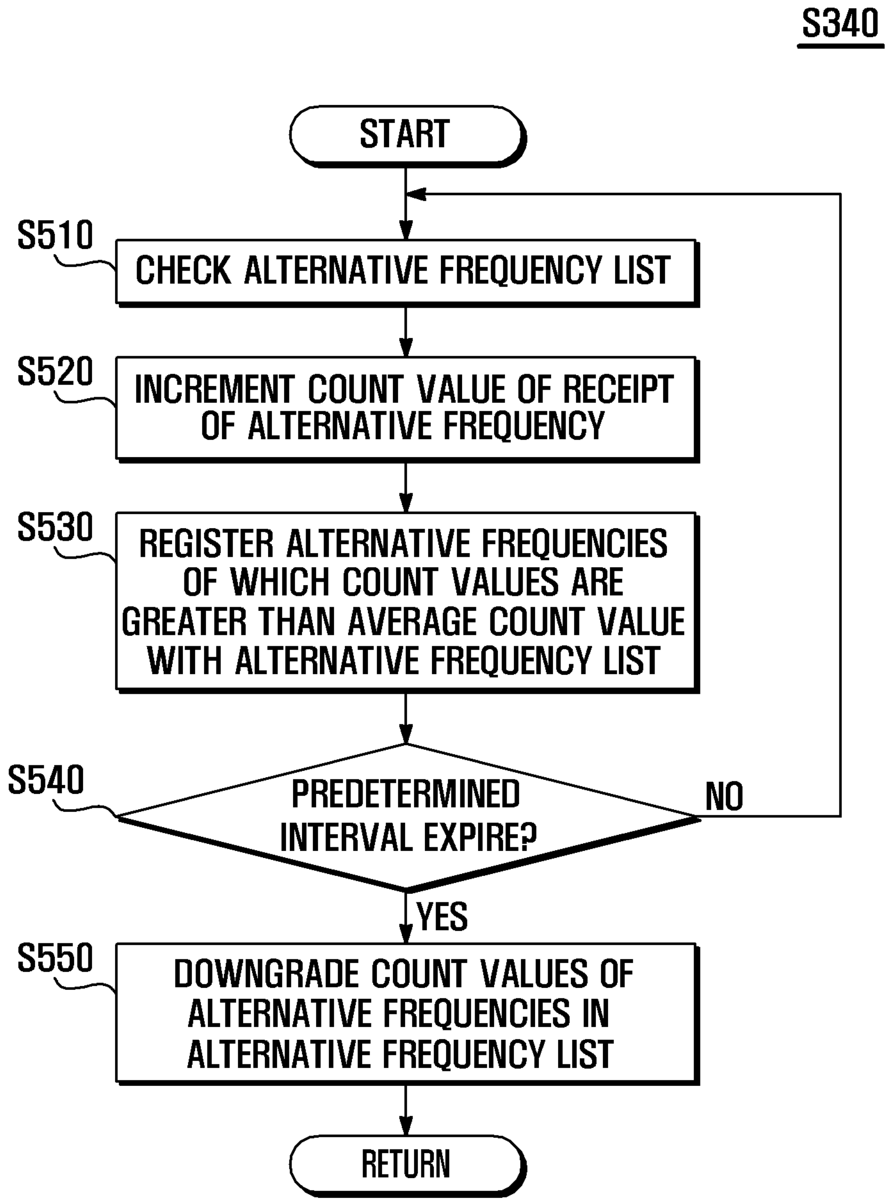
FIG. 5 is a flowchart illustrating an alternative frequency list management operation according to an exemplary embodiment of the present invention.

FIG. 5 is a flowchart illustrating an alternative frequency list management operation according to an exemplary embodiment of the present invention.

Referring to FIG. 5, the control unit 260 controls the radio data comparator 260D to check the alternative frequency list stored in the radio data storage 250A at step S510 and increments the count value of receipt of each alternative frequency registered with the alternative frequency list at step S520. Next, the control unit 260 controls the radio data comparator 260D to compare the count for each alternative frequency with a threshold count value, update the alternative frequency list with the frequencies of which receipt count values are greater than an average count value of the total alternative frequencies, and store the updated alternative frequency list at step S530. Next, the control unit 260 controls the radio data comparator 260D to determine whether a preset interval has expired at step S540. If the preset interval has not expired, the process proceeds to step S510. Here, the control unit 260 controls to repeat steps S510 to S540 whenever an alternative frequency list is received.

In contrast, if the preset period has expired at step S540, the control unit 260 downgrades the count values of the total alternative frequencies to a value less than the threshold count value at step S550. Although the count values of the alternative frequencies are downloaded or reset to 0 in certain exemplary embodiments, the present invention is not limited thereto.

How to degrade or reset the count values of the alternative frequencies is described hereinafter with reference to FIG. 6.

Figure 6:
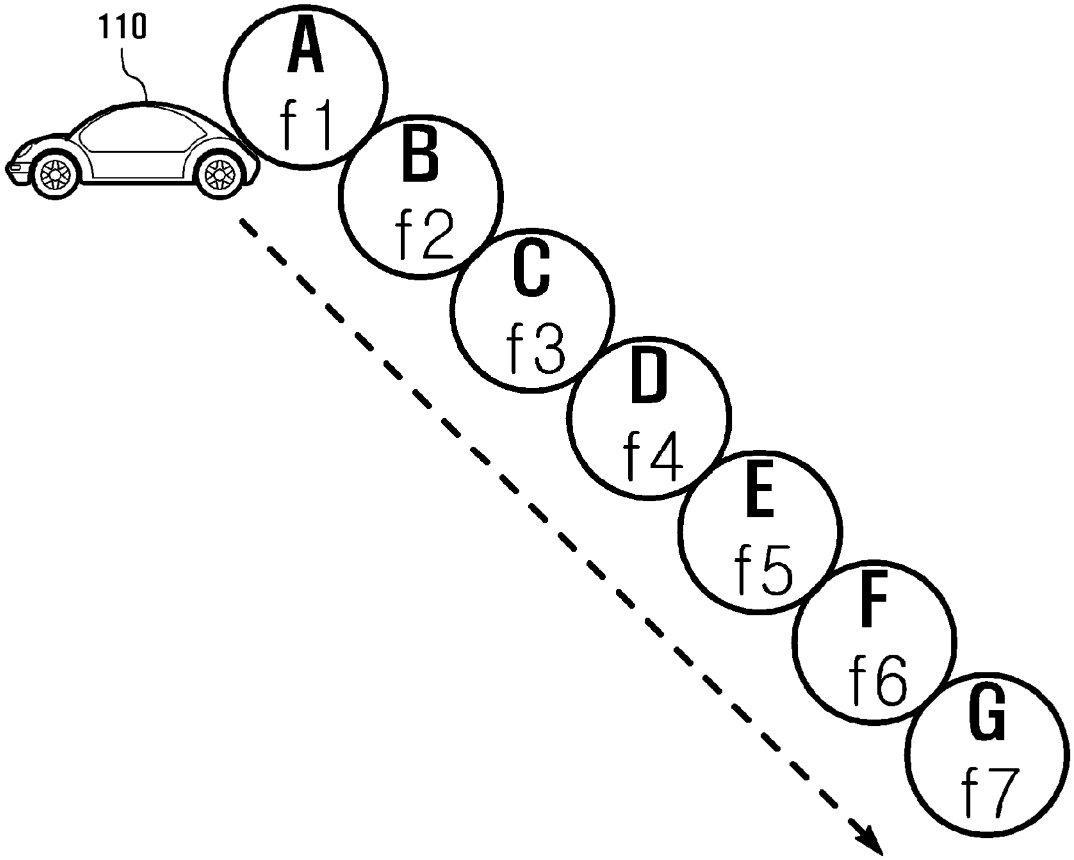
FIG. 6 is a conceptual diagram for illustrating a count value reset process of an alternative frequency method according to an exemplary embodiment of the present invention.

FIG. 6 is a conceptual diagram illustrating a count value reset process of an alternative frequency method according to an exemplary embodiment of the present invention.

Referring to FIG. 6, it is assumed that the mobile terminal 110 moves from area A to area G that broadcast the same radio program at their respective frequencies f1 to f7. Also, it is assumed that the broadcast station of each area generates the alternative frequency list with the frequencies of its neighbor broadcast station. For example, the alternative frequency list transmitted by the broadcast station of area B contains the frequencies of the areas A, B, and C as the alternative frequencies. It is noted that the above conditions are assumed only for explaining the reason why the count values for all of the alternative frequencies are reset in view of management.

While the mobile terminal 110 moves from area A to area G, the Alternative Frequencies (AF) and their count values at each area are shown in Table 3.

TABLE 3

| | A | B | C | D | E | F | G |
|---|---|---|---|---|---|---|---|
| f1 | 1 | 2 | 2 | 2 | 2 | 2 | 2 |
| f2 | 1 | 2 | 3 | 3 | 3 | 3 | 3 |
| f3 | 0 | 1 | 2 | 3 | 3 | 3 | 3 |
| f4 | 0 | 0 | 1 | 2 | 3 | 3 | 3 |
| f5 | 0 | 0 | 0 | 2 | 2 | 3 | 3 |
| f6 | 0 | 0 | 0 | 0 | 1 | 2 | 3 |
| f7 | 0 | 0 | 0 | 0 | 0 | 1 | 2 |
| AF | f1, f2 | f1, f2, f3 | f1, f2, f3 | f1, f2, f3, f4 | f1, f2, f3, f4, f5 | f1, f2, f3, f4, f5 | f1, f2, f3, f4, f5, f6 |

Referring to Table 3, the broadcast station of the area A broadcasts the radio data carrying an alternative frequency list having its frequency f1 and the frequency f2 used in its neighbor area B. Upon receipt of this alternative frequency list, the mobile terminal 110 increments the counts of the frequencies f1 and f2 by 1, respectively. At this time, the average count value of all alternative frequencies is 0.3 such that the mobile terminal 110 removes the alternative frequencies of which count values are less than 0.3 from its alternative frequency list, thereby the frequencies f1 and f2 being remained as the available alternative frequencies in the area A.

In this manner, the alternative frequency list of the mobile terminal 110 is updated as the mobile terminal 110 passes the areas B to G.

When the mobile terminal 110 moves into the area G, the area A is so far from the area G that there is little possibility that the mobile terminal 110 receives the target radio program at the frequency f1 in the area G. If all the counts of the alternative frequencies including the frequencies having little possibility to receive the target radio program are incremented, the alternative frequency list acquired in the area G includes the frequency f1, resulting in waste of time for searching for alternative frequencies.

In order to solve this problem, the mobile terminal 110 degrades the count values of the alternative frequencies periodically (e.g. decrements the counts to become less than a preset value or resets all the counts to 0). Accordingly, Table 3 can be modified as shown in Table 4.

TABLE 4

| | A | B | Reset | C | D | Reset | E | F | Reset | G |
|---|---|---|---|---|---|---|---|---|---|---|
| f1 | 1 | 2 | 0 | 0 | 0 | 0 | 0 | 0 | 0 | 0 |
| f2 | 1 | 2 | 0 | 1 | 1 | 0 | 0 | 0 | 0 | 0 |
| f3 | 0 | 1 | 0 | 1 | 2 | 0 | 0 | 0 | 0 | 0 |
| F4 | 0 | 0 | 0 | 1 | 2 | 0 | 1 | 1 | 0 | 0 |
| F5 | 0 | 0 | 0 | 0 | 1 | 0 | 2 | 2 | 0 | 0 |
| F6 | 0 | 0 | 0 | 0 | 0 | 0 | 2 | 2 | 0 | 1 |
| F7 | 0 | 0 | 0 | 0 | 0 | 0 | 0 | 1 | 0 | 1 |
| AF | f1, f2 | f1, f2, f3 | | f2, f3, f4 | f2, f3, f4, f5 | | f4, f5, f6 | f4, f5, f6, f7 | | f6, f7 |

Although the count values are reset to 0 when the mobile terminal passes the respective areas B, D, and F in Table 4, the count value reset mechanism is not limited thereto.

In Table 4, the alternative frequency list acquired in the area A contains frequencies f1 and f2, whereas the alternative frequency list acquired in the area G contains frequencies f6 and f7. That is, the alternative frequencies f1 and f2 used in the areas A and B that are far from the areas G are excluded from the alternative frequency list in the area G, resulting in reduction of alternative frequency search time.

As described above, the alternative frequency search method and mobile terminal of the present invention updates the alternative frequency list when the currently received program identifier is substantially identical with the previously stored program identifier, thereby improving accuracy of alternative frequency search.

Also, the alternative frequency search method and mobile terminal of the present invention manages the alternative frequency list with the alternative frequencies allocated for the broadcast zones adjacent to the current broadcast zone in which the mobile terminal is positioned, resulting in fast alternative frequency search.

While the invention has been shown and described with reference to certain exemplary embodiments thereof, it will be understood by those skilled in the art that various changes in form and details may be made therein without departing from the spirit and scope of the present invention, as defined in the appended claims and their equivalents.

What is claimed is:

1. A mobile terminal having an alternative frequency search function, the terminal comprising:

a control unit comprising:

a radio data decoder for decoding radio data containing a program identifier and for differentiating the radio data by type;

a radio data filter for extracting the program identifier from the radio data, for comparing the extracted program identifier with a previously stored program identifier, and for instructing to update an alternative frequency list when the extracted program identifier is substantially identical with the previously stored program identifier; and a radio data updater for updating the alternative frequency list in response to an instruction of the radio data filter;

a storage unit for storing the alternative frequency list and the differentiated radio data; and a radio data comparator for counting a number of receipts of each of alternative frequencies listed in the alternative frequency list after updating the alternative frequency list, and for removing alternative frequencies of which a count value is less than an average number of receipts from the alternative frequency list.

2. The terminal of claim 1, wherein the radio data comparator resets the count values of the alternative frequencies at a preset interval.

3. The terminal of claim 1, wherein the control unit performs alternative frequency search at an initially tuned frequency when no alternative frequency list exists.

4. The terminal of claim 1, wherein the control unit performs alternative frequency search at an initially tuned frequency when the extracted program identifier is not substantially identical with the previously stored program identifier.

5. The terminal of claim 1, wherein the radio data decoder checks the received radio data multiple times.

6. The terminal of claim 5, wherein the radio data decoder checks the program identifier at least 3 times.

7. An alternative frequency search method for a mobile terminal, the method comprising:

decoding radio data including a program identifier and differentiating decoded radio data by type;

comparing the program identifier decoded from the radio data with a previously stored program identifier;

updating, when the decoded program identifier is substantially identical with the previously stored program identifier, an alternative frequency list;

counting receipts of each of alternative frequencies listed in the alternative frequency list; and removing an alternative frequency of which a count value of receipts is less than an average number of receipts of total alternative frequencies from the alternative frequency list.

8. The method of claim 7, wherein the updating of the alternative frequency list comprises attempting, when the decoded program identifier is not substantially identical with the previously stored program identifier, alternative frequency search at an initially tuned frequency.

9. The method of claim 7, further comprising resetting the count values of the alternative frequencies in a preset interval.

10. The method of claim 7, further comprising:

determining whether a previously stored alternative frequency list exists; and attempting, when no previously stored alternative frequency list exists, alternative frequency search at an initially tuned frequency.

11. The method of claim 7, wherein the decoding of radio data is repeated multiple times.

12. The method of claim 11, wherein the comparing of the program identifier decoded from the radio data is repeated at least three times.

13. An alternative frequency search method for a mobile terminal, the method comprising:

measuring signal strength of a radio program received using a radio module;

counting a number of receipts of each of alternative frequencies;

determining whether the received signal strength is equal to or less than a threshold value;

if it is determined that the received signal strength is greater than the threshold value, continuing to receive the radio program at a current frequency;

if it is determined that the received signal strength is equal to or less than the threshold value, searching the alternative frequencies; and managing an alternative frequency list by removing such alternative frequencies, of which the number of receipts is less than an average number of receipts of total alternative frequencies, from the alternative frequency list.

14. The method of claim 13, wherein the searching for the alternative frequencies comprises:

receiving radio data;

decoding the received radio data;

differentiating the decoded radio data by type;

filtering a Program Identifier (PI);

determining whether the filtered program identifier is substantially identical with a previously stored program identifier; and if it is determined that the filtered program identifier is substantially identical with the previously stored program identifier, updating the alternative frequency list.

15. The method of claim 13, wherein the managing of the alternative frequency list comprises:

checking the alternative frequency list stored in radio data;

incrementing count values of receipt of each alternative frequency registered with the alternative frequency list;

registering the alternative frequencies of which receipt count values are greater than an average count value of the total alternative frequencies;

determining whether a preset interval has expired; and if the preset interval has expired, downgrading the count values of the alternative frequencies to a value less than the threshold count value.

* * * * *